United States Patent [19]

Lim

[11] Patent Number: 5,588,027
[45] Date of Patent: Dec. 24, 1996

[54] DIGITAL DEMODULATING METHOD AND CIRCUIT FOR USE IN A TIME-DIVISION MULTIPLE ACCESS CHANNEL

[75] Inventor: Moo-Gil Lim, Seoul, Rep. of Korea

[73] Assignee: SamSung Electronics Co., Ltd., Suwon, Rep. of Korea

[21] Appl. No.: 176,451

[22] Filed: Dec. 30, 1993

[30] Foreign Application Priority Data

Jan. 30, 1993 [KR] Rep. of Korea ............... 1245/1993

[51] Int. Cl.[6] .................................. H04L 27/22
[52] U.S. Cl. .................... 375/330; 375/331; 375/341; 329/304
[58] Field of Search ..................... 375/13, 83, 84, 375/85, 86, 94, 96, 106, 52, 53, 54, 231, 329, 330–332, 340, 342, 350, 279–281, 283, 355, 343, 341, 203, 262; 329/304; 370/95.3

[56] References Cited

U.S. PATENT DOCUMENTS

| | | | |
|---|---|---|---|
| 4,053,837 | 10/1977 | Ryan | 333/18 |
| 4,457,004 | 6/1984 | Gersho et al. | 375/53 |
| 4,583,048 | 4/1986 | Gumacos | 375/90 |
| 4,599,732 | 7/1986 | LeFever | 375/13 |
| 4,814,719 | 3/1989 | Guyer | 375/83 |
| 4,871,975 | 10/1989 | Namata | 375/87 |
| 4,879,728 | 11/1989 | Tarallo | 375/84 |
| 5,027,371 | 6/1991 | Sehier | 375/15 |
| 5,031,193 | 7/1991 | Atkinson et al. | 375/96 |
| 5,237,586 | 8/1993 | Bottomley | 375/1 |
| 5,263,052 | 11/1993 | Borth | 375/94 |
| 5,276,706 | 1/1994 | Critchlow | 375/96 |
| 5,282,228 | 1/1994 | Scott | 375/97 |
| 5,285,480 | 2/1994 | Chennakeshu | 375/101 |
| 5,303,263 | 4/1994 | Shoji | 375/11 |
| 5,309,482 | 5/1994 | Wright et al. | 375/96 |
| 5,311,545 | 5/1994 | Critchlow | 375/14 |
| 5,313,493 | 5/1994 | Dutta | 375/56 |

OTHER PUBLICATIONS

"Dictionary of Scientific and Technical Terms" McGraw–Hill.

*Primary Examiner*—Tesfaldet Bocure
*Attorney, Agent, or Firm*—Robert E. Bushnell, Esq.

[57] ABSTRACT

A circuit and method for demodulating a π/4-DQPSK (differentially quadrature phase shift keying) modulated signal. A receiving π/4-DQPSK modulated signal is shifted to a base band and simultaneously separated to an I channel and Q channel. The separated I channel and Q channel signals are converted into digital data. The digitally converted data is stored in a memory and decoded to binary data by phase comparison or Viterbi algorithm.

14 Claims, 11 Drawing Sheets

DIGITAL DEMODULATING METHOD AND CIRCUIT FOR USE IN A TIME-DIVISION MULTIPLE ACCESS CHANNEL

BACKGROUND OF THE INVENTION

The present invention relates to a digital demodulating circuit and method of a time-division multiple access (TDMA) channel for use in radio communications, and more particularly to a circuit and method for demodulating a π/4-DQPSK (differentially quadrature phase shift keying) modulated signal.

Generally, π/4-DQPSK is one of digital modulation systems for modulating the phase of a transmission signal. The π/4-DQPSK demodulation has an advantage in that band diffusion caused by the instantaneous phase transition of a modulated signal is small since it has maximum instantaneous transition value smaller than that of a traditional QPSK modulation system.

An example of a conventional π/4-DQPSK demodulator is shown in FIG. 1. A π/4-DQPSK modulated signal is received to a linear receiver 103 through an antenna 101. The output of the linear receiver 103 is applied to a delay circuit 125 and to a frequency multiplier 105. The 4 frequency multiplied output through the frequency multiplier 105 and the output of a ½ symbol clock circuit 109 are mixed in a mixer 107 to detect an accurate data clock at a base band of a received signal band from the output of the frequency multiplier 105. The output of the mixer 107 is filtered with a constant band through a band-pass filter 111 and then applied to a limiter 113. The limiter 113 eliminates a part beyond a given range among input signals and the output thereof is 4-frequency demultiplied in a frequency demultiplier 115. The output of the frequency demultiplier 115 is applied to a multiplier 119 and to a phase shifter 117. The phase shifter 117 phase-shifts the output of the demultiplier 115 by 90° and the phase-shifted output is supplied to a multiplier 121. Meanwhile, the delay circuit 125 delays the output of the linear receiver 103 and applies the delayed output to the multipliers 119 and 121. The multipliers 119 and 121 multiply the delayed signal through the delay circuit 125 by the output of the demultiplier 115 and the output of the phase shifter 117, respectively. A differential phase detector 123 receiving the outputs of the multipliers 119 and 121 generates binary data in accordance with the phase difference between the outputs of the multipliers 119 and 121.

However, such as a demodulated method should use a phase synchronizing loop circuit including a symbol clock recovery circuit, or a frequency multiplier of second order or more, etc. in order to accurately detect binary data. Therefore, the design is very complicate and circuit construction for a desired function is difficult.

SUMMARY OF THE INVENTION

It is an object of the present invention to provide a circuit which can facilitate design and construction without a clock recovery circuit.

It is another object of the present invention to provide a demodulating method and circuit which can reduce a bit error rate generated in accordance with a multipath fading effect in demodulating a π/4 DQPSK modulated signal.

It is still another object of the present invention to provide a digital demodulating method and circuit which can achieve low power consumption and small one chip and easily connect to a peripheral circuit.

According to one aspect of the present invention, a receiving π/4-DQPSK modulated signal is shifted to a base band and simultaneously separated to an I channel and Q channel. The separated I-channel and Q-channel signals are converted into digital data. The digitally converted data is stored in a memory and decoded to binary data by phase comparison or Viterbi algorithm.

A signal received from a demodulating circuit according to the present invention is transmitted and received by a general time-division multiple communication system and includes training data of the number of given bits every time slot.

BRIEF DESCRIPTION OF THE DRAWINGS

The invention will be more fully understood from the following detailed description in conjunction with the attached drawings, in which.

DETAILED DESCRIPTION OF THE PREFERRED EMBODIMENT

Figure 1:
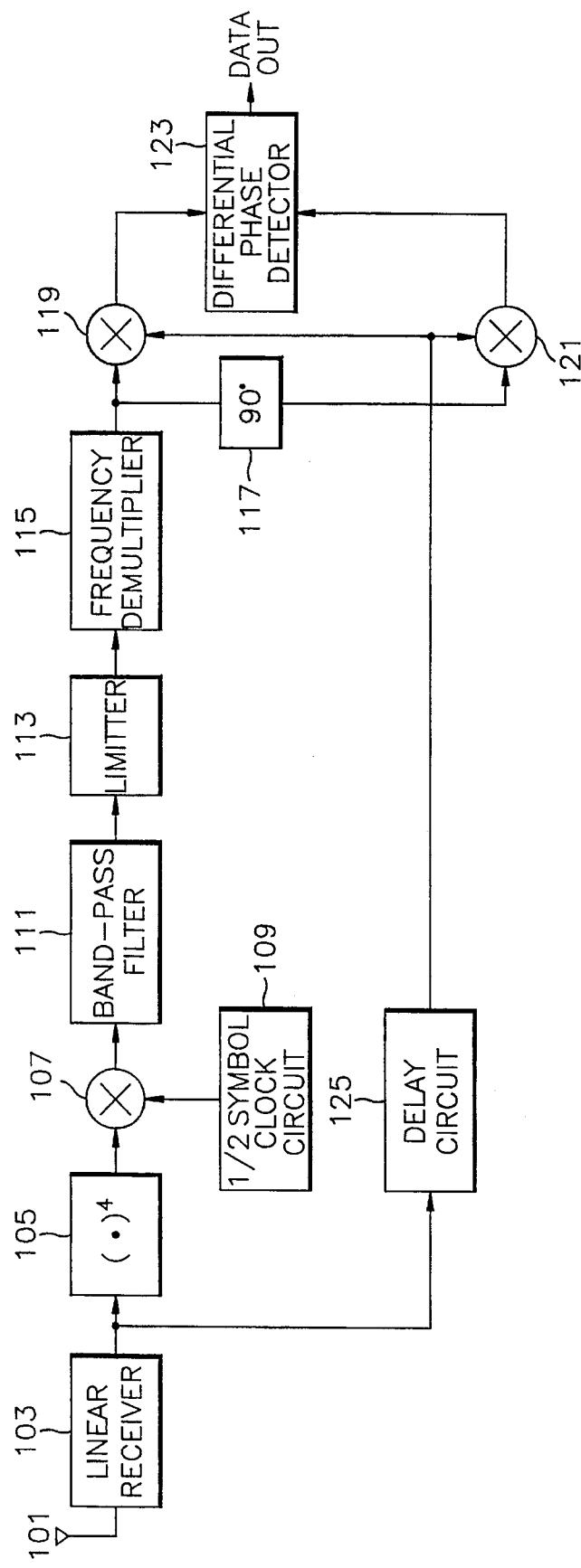
FIG. 1 is a block diagram illustrating a conventional π/4-DQPSK demodulator.

In the explanation of the drawings, like reference numerals and symbols are used to designate like elements.

Figure 2:
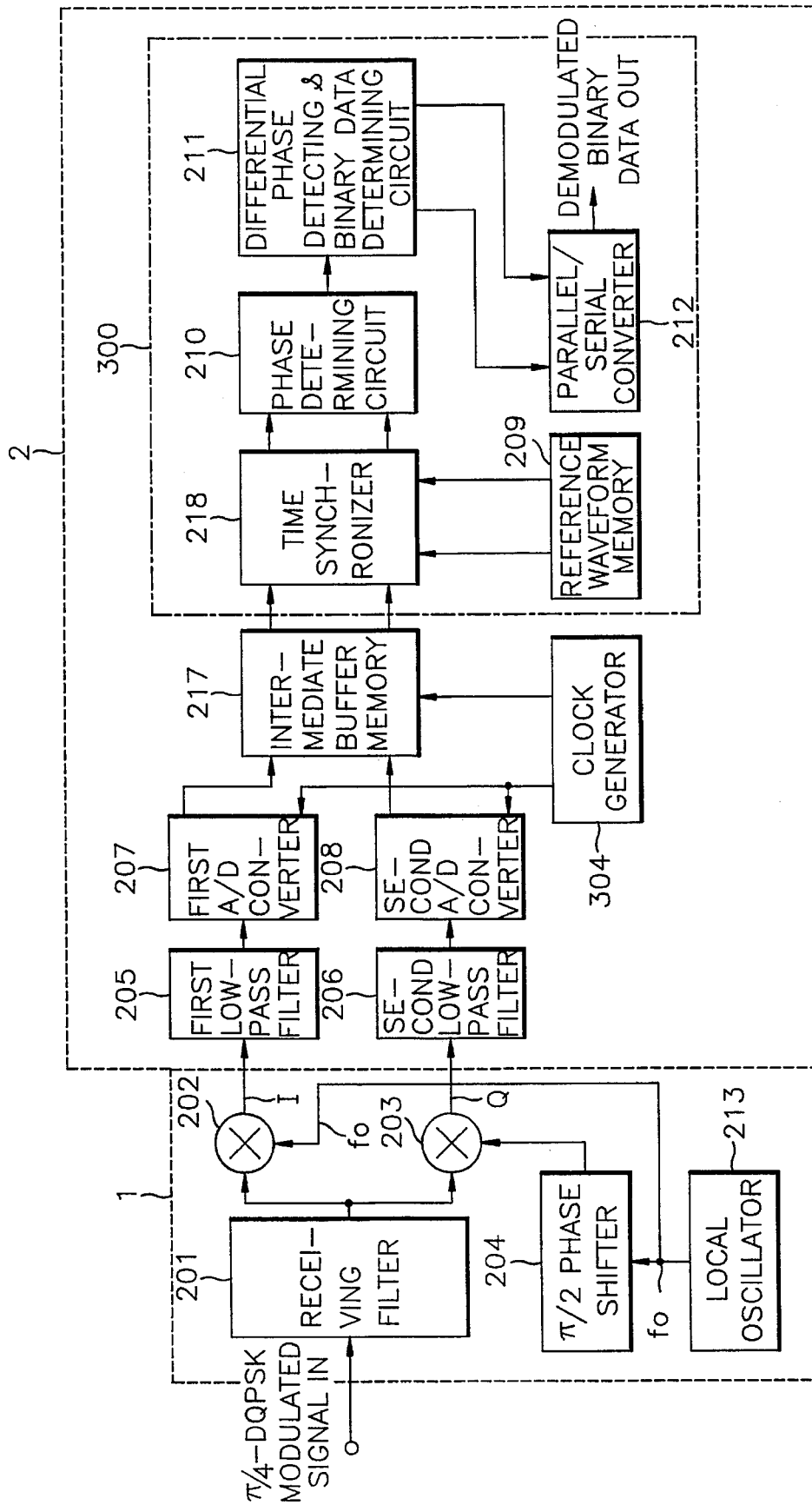
FIG. 2 is a block diagram illustrating a demodulating circuit according to present invention.

Referring to FIG. 2, a demodulating circuit according to the present invention is broadly divided into an RF (radio frequency) processing circuit 1 and a digital processing circuit 2. The RF processing circuit I changes a received π/4-DQPSK modulated signal to a base band and simultaneously separates the signal to an I channel and a Q channel. The digital processing circuit 2 includes an A/D converter (analog-to-digital converter), digital signal processor and peripheral memory circuit.

A π/4-DQPSK modulated signal received from an antenna (not shown) is filtered in a receiving filter 201 of the RF processing circuit 1. The filtered signal is multiplied by a local carrier wave fo generated from a local oscillator 213 in a first multiplier 202 to change the filtered signal to the base band and simultaneously separate it to the I channel. The filtered signal is also multiplied by a 90° phase-shifted signal of the local carrier wave fo through a π/2 phase shifter 204 in a second mixer 203 to change the filtered signal to the base band and separate it to the Q channel.

First and second low-pass filters 205 and 206 of the digital processing circuit 2 low-pass filter signals passing through the I channel and Q channel separated from the multipliers 202 and 203, respectively. Analog signals filtered from the first and second low-pass filters 205 and 206 are converted into digital signals in first and second A/D converters 207 and 208. An intermediate buffer memory 217 of a dual port type temporarily stores data since the write speed from the first and second A/D converters 207 and 208 differs from the read speed from a digital processing circuit 300. A clock generator 304 provides a clock for use in oversampling of the first and second A/D converters 207 and 208 and for use in buffering by the intermediate buffer memory 217. A reference waveform memory 209 stores data for a reference modulation waveform. A time synchronizer 218 calculates a complex correlation function value between the output of the intermediate buffer memory 217 and a reference training modulation signal generated from the reference waveform memory 209 and detects a maximum peak point within a time slot of the calculated complex correlation function value. The time synchronizer 218 also generates a data set on the basis of the maximum peak point. A phase determining circuit 210 determines the phase of a signal selected from the time synchronizer 218 every period T. A differential phase detecting and binary data determining circuit 211 detects a phase difference for decoding according to the phase determined from the phase determining circuit 210 and determines binary data adapted for a π/4-DQPSK modulation characteristic according to the detected phase difference. A parallel/serial converter 212 converts the output of the differential phase detecting and data determining circuit 211 into serial data to generate a differential phase value by the unit of 2 bits.

Figure 3:
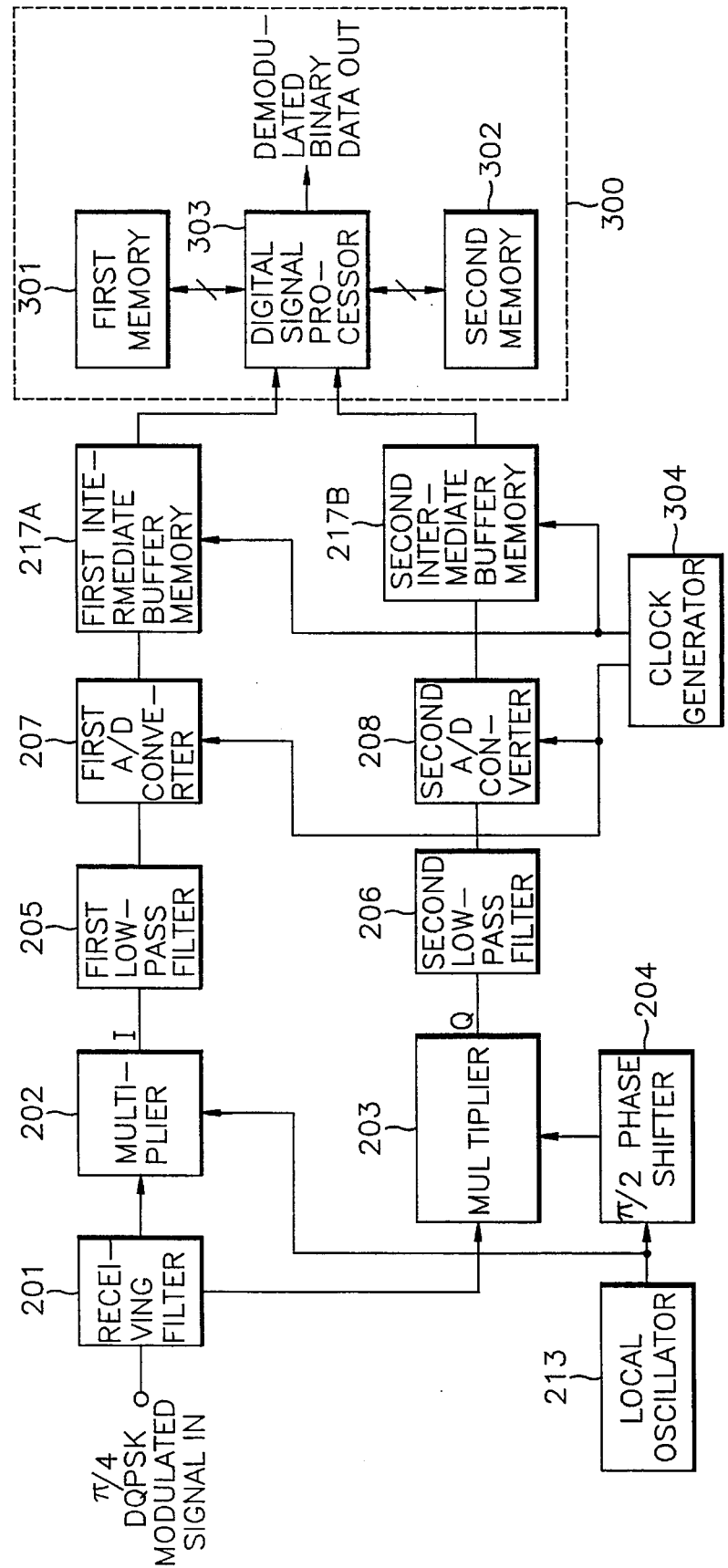
FIG. 3 is a block diagram illustrating an embodiment of FIG. 2 according to the present invention.
Figure 4:
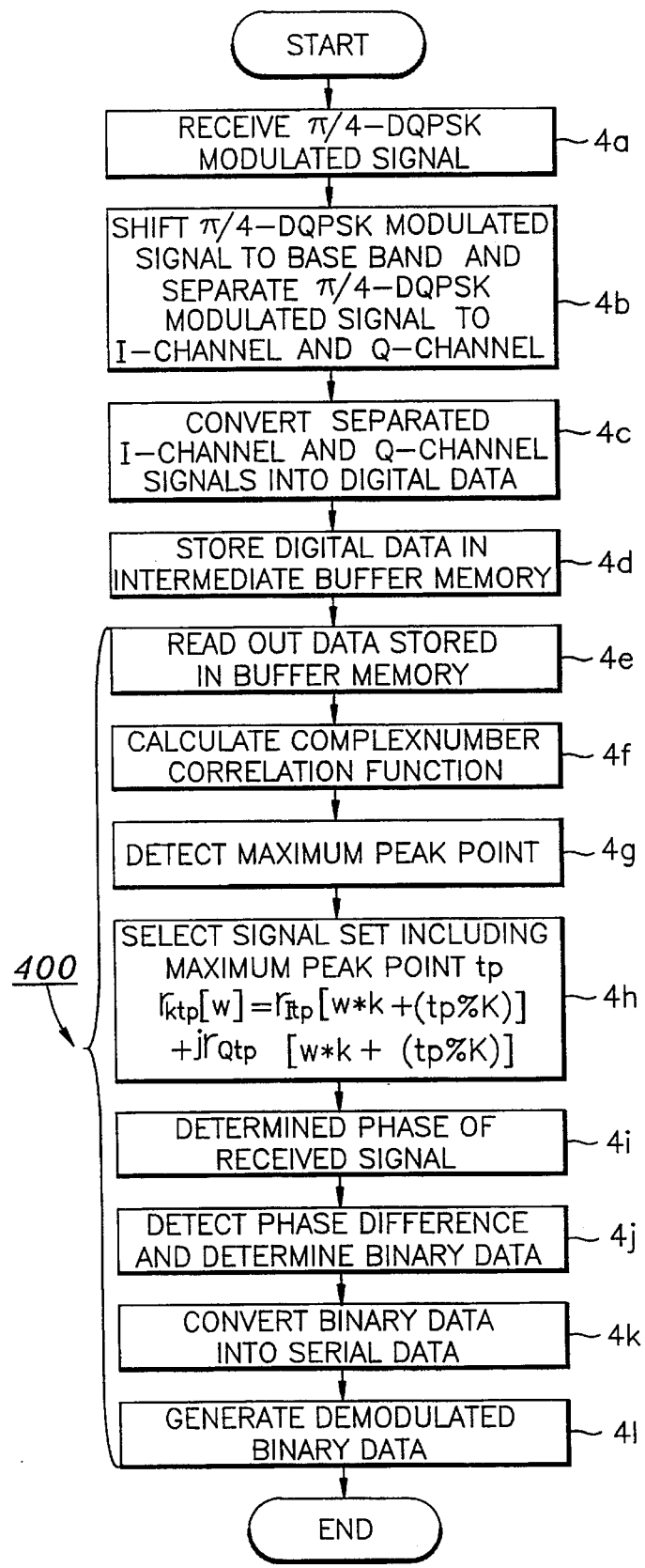
FIG. 4 is a flow chart illustrating a demodulating process according to the present invention.

FIG. 3 shows an embodiment of the demodulating circuit of FIG. 2 according to the present invention. The time synchronizer 218, phase determining circuit 210, differential phase detecting and binary data determining circuit 211, parallel/serial converter 212 and reference waveform memory 209 of FIG. 2 are achieved by software in a digital signal processor 303 as shown in FIG. 4, which will be described later on, and first and second memories 301 and 302 of FIG. 3 store programs shown in FIGS. 4 and 6A–6E. Data generated from first and second memories 217A and 217B is processed in the digital signal processor 303.

FIG. 4 shows a flow chart of a demodulating process according to the present invention. Steps 4a–4d are processed in the RF processing circuit 1, and steps 4e–4l illustrate a demodulating process 400 processed by software in the digital signal processor 303.

The demodulating process in the digital signal processor 303 includes a first process of detecting the location of data by calculating a complex correlation function using reference training modulation data in order to adjust bit synchronization of digitally converted data, a second process of detecting a maximum peak point within a time slot from the calculated complex correlation function, a third process of selecting a signal set including the maximum peak point, and a fourth process of detecting a phase difference from the selected signal set, determining binary data and generating demodulated binary data by converting the binary data into serial data.

Figure 5A:
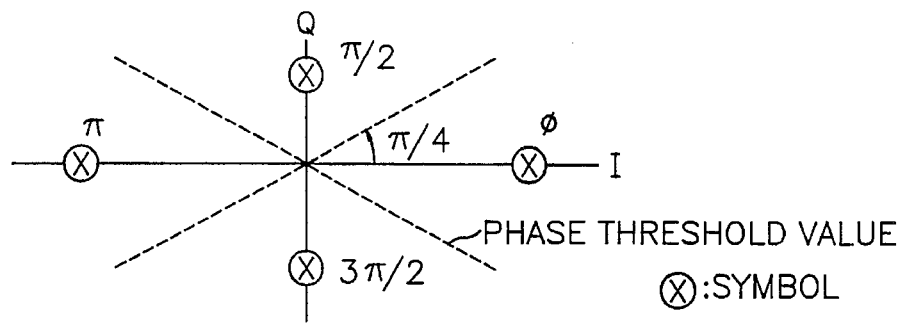
FIGS. 5A to 5D are diagrams illustrating a phase value of even and odd symbols and a threshold value at I-channel and Q-channel amplitude regions according to the present invention.
Figure 5B:
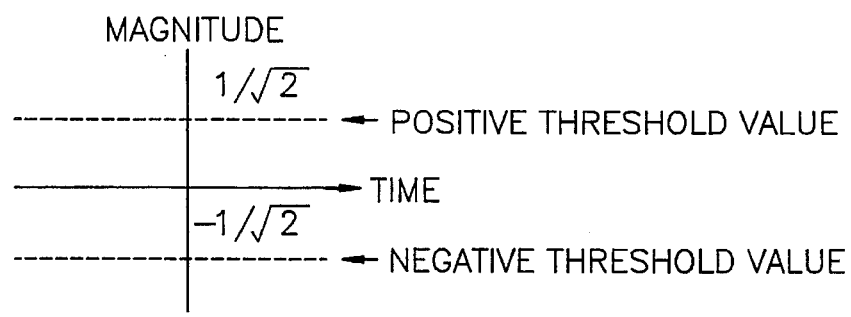
Figure 5C:
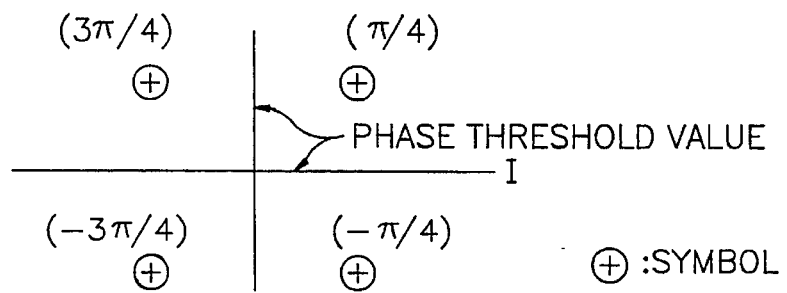

FIGS. 5A to 5D show a phase value of symbols $\otimes$ and $\otimes$ and a threshold value at I-channel and Q-channel amplitude regions. FIG. 5A shows an even symbol $\otimes$ having one value within a given phase threshold; FIG. 5B a threshold value of the even symbol $\otimes$ at I-channel and Q-channel amplitude regions; FIG. 5C an odd symbol $\otimes$ having one value within a given phase threshold; and FIG. 5D a threshold value of the odd symbol $\otimes$ at I-channel and Q-channel amplitude regions.

FIGS. 6A to 6E are flow charts showing a more detailed process of steps 4e–4j of FIG. 4.

Now, the preferred embodiment of the present invention is described in detail with reference to FIGS. 2 to 6E.

Steps 4a–4d of FIG. 4 are processed in the RF processing circuit 1 of FIG. 2. The π/4-DQPSK modulated signal $r(t)=A \cos[w_c t+\phi(t)]+n(t)$ (where n(t) is a noise signal) is applied to the multipliers 202 and 203 via the receiving filter 201. The multiplier 202 separates an I channel by multiplying the output of the receiving filter 201 by the local carrier wave fo generated from the local oscillator 213, and the multiplier 203 separates a Q channel by multiplying the output of the receiving filter 201 by the output of the π/2 phase shifter 204 $[r_{BB}(t)=r_I(t)+jr_Q(t)+n_{BB}(t)-A'[\cos Å(t)+j \sin Å(t)]+n_{BB}(t)]$ (where $n_{BB}(t)$ is a base band noise signal). The separated I-channel and Q-channel signals are filtered in the first and second low-pass filters 205 and 206 and converted into digital data in the first and second A/D converters 207 and 208 $[r[p]=r_I[p]+jr_Q[P]=r_I(PTs)+jr_Q(PTs)$ (where P=0, . . . K*L−1, and Ts is a sampling period). The digitally converted data through the first and second A/D converters 207 and 208 is stored in the intermediate buffer memories 217A and 217B. The first and second A/D converters 207 and 208 and the intermediate buffer memories 217A and 217B are controlled by the output of a clock generator 304. The first and second A/D converters 207 and 208 demand n times an oversampling clock for the conversion into the digital data and the intermediate buffer memories 217A and 217B need a read/write control signal and a control signal. The digital signal processor 303 performs each function of the digital processing circuit 2 of FIG. 2. That is, the digital signal processor 303 reads out the digital data from the intermediate buffer memories 217A and 217B to execute demodulation algorithm through steps 4e–4l of FIG. 4 and generate demodulated binary data. Steps 4e–4l will now be explained with reference to FIGS. 6A to 6E.

Figure 6A:
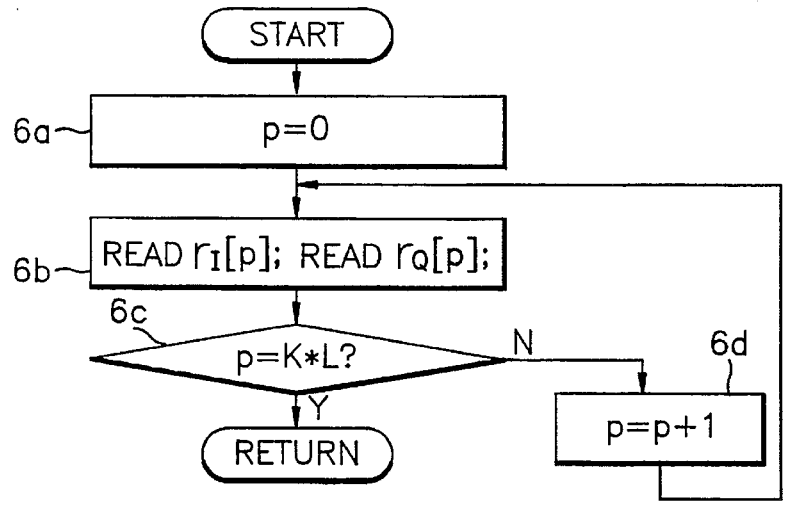
FIGS. 6A to 6E are flow charts illustrating a more detailed process of steps 4e–4j of FIG. 4.
Figure 6B:
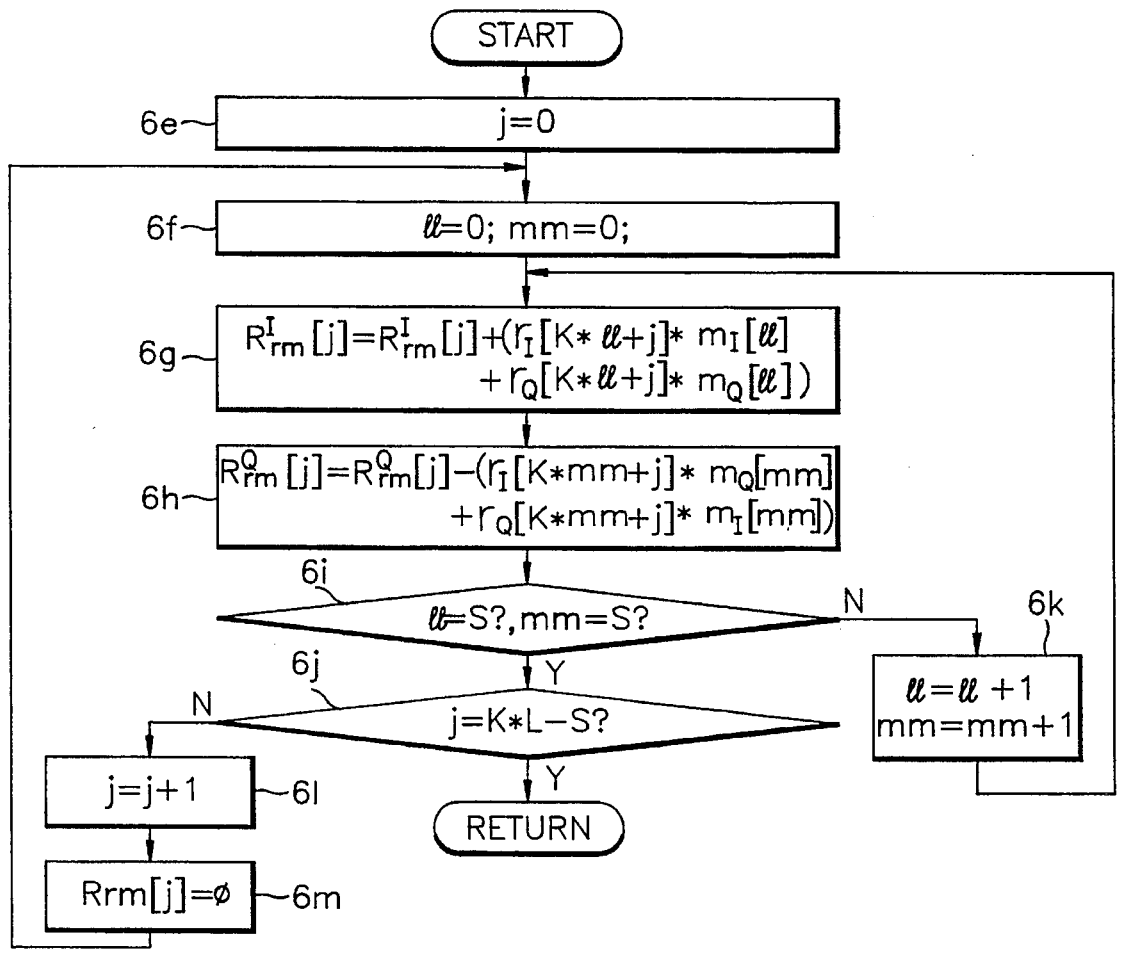

Step 4e is shown in detail in FIG. 6A. At step 4e, the digital signal processor 303 reads out data from the intermediate buffer memories 217A and 217B. In order to read out the data recorded from the intermediate buffer memories 217A and 217B, the digital signal processor 303 sets, at step 6a, a sampling period index p to 0. At step 6b, the digital signal processor 303 reads out I-channel and Q-channel data $[r_I(p), r_Q(p)]$ from the intermediate buffer memories 217A and 217B. At step 6c, the digital signal processor 303 checks whether or not the sampling period index p is equal to a value obtained by multiplying an oversampling speed K by a message length L (for example, 1486 bits) to see if the sampling period index p reaches at the last point. If the sampling period index p does not reach at the last sampling period index (K×L), the sampling period index p is incremented by 1 at step 6d and step 6d returns to step 6b. Otherwise, the digital signal processor 303 calculates, at step 4f, a complex correlation function in order to adjust bit synchronization between the reference training modulation data generated from the first or second memory 301 or 302 and the data read from the intermediate buffer memories 217A and 217B. This process is shown in FIG. 6B.

The digital signal processor 303 sets, at step 6e, a complex correlation function processing index j to 0. At step 6f, an I-channel complex correlation function calculating index ll is set to 0 and a Q-channel complex correlation function calculating index mm is set to 0. In order to adjust the bit synchronization of an input signal, the digital signal processor 303 calculates, at steps 6g and 6h, a real number value $R^Irm[j]$ and an imaginary number value $R^Qrm[j]$ of the complex correlation function (where $R^Irm[j]=R^Irm[j]+(r_I(K*ll+j)*m_I[ll]+r_Q(K*ll+j)*m_Q[ll]$, and $R^Qrm[j]=R^Qrm[j]+(r_I(K*mm+j)*m_Q[mm]+r_Q(K*mm+j)*m_I[mm])$ by multiplying the reference training data $m[u]=m_I[u]+jm_Q[u]$ (where u=0, 1, 2, . . . ) by the input signal of step 6b. At step 6i, the digital signal processor 303 examines whether or not the I-channel and Q-channel complex correlation function calculating indexes ll and mm reach a word length S (for example, 26 bits) for synchronizing with a reference signal. If the indexes ll and mm do not reach the word length S, the indexes ll and mm are incremented by 1 at step 6k. Step 6k returns to step 6g. If the indexes ll and mm are incremented by 1 at step 6k. Step 6k returns to step 6g. If the indexes ll and mm reach the word length S, the index j is checked to see if j=K*L−S (where K is an oversampling speed and L is a message length). If the index is not equal to a value (K*L−S), the index j is incremented by 1 at step 6l. At step 6m, a buffer Rrm[j] being used in calculation is set to 0 in order to calculate the next complex correlation function. If the index has the value (K*L−S), step 6j is followed by step 4g to detect a maximum peak point of the input signal.

Figure 6C:
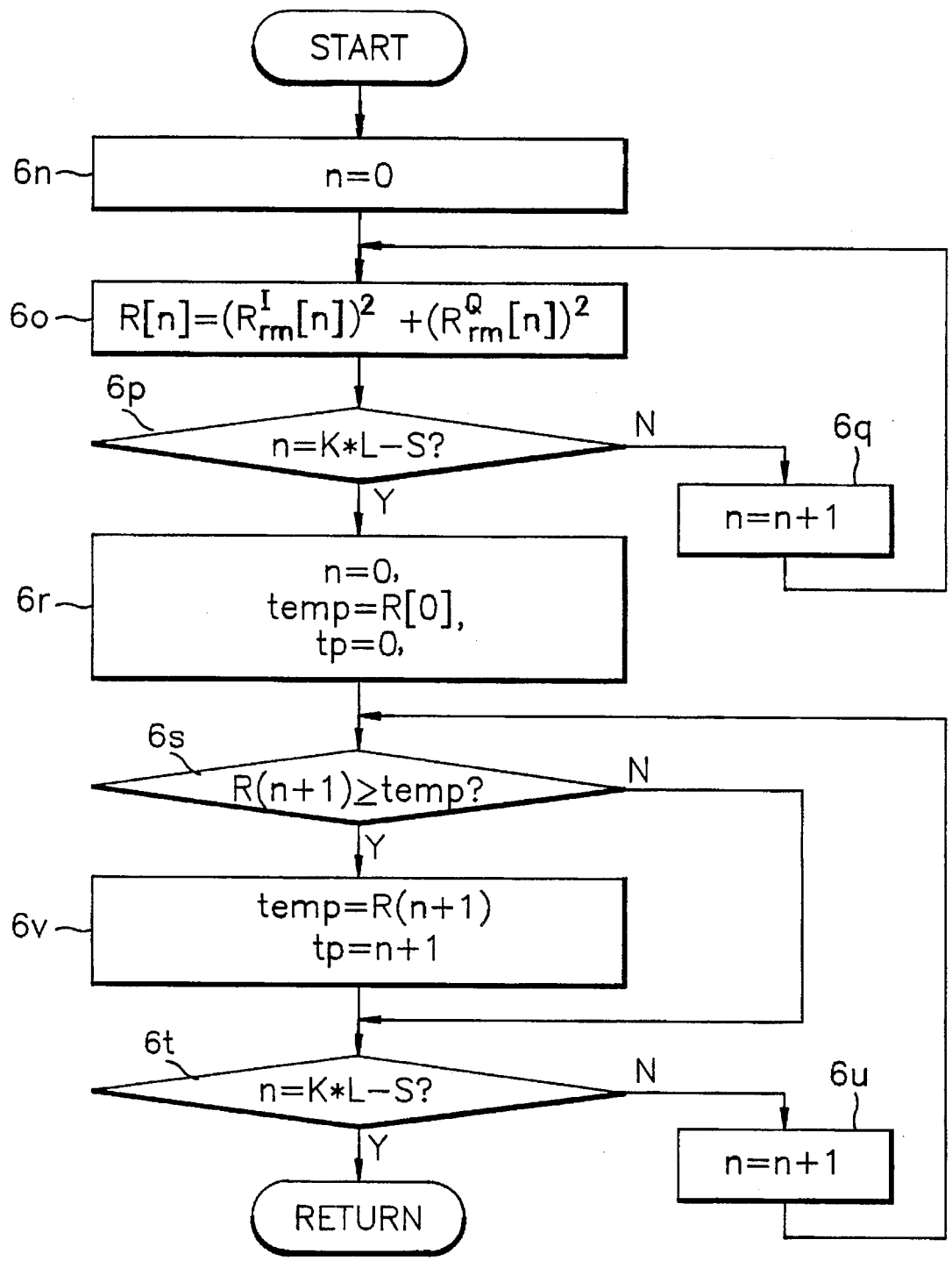

Step 4g for detecting the maximum peak point is indicated in FIG. 6C. At step 6n, the digital signal processor 303 sets an index n to 0 for determining synchronization from the calculated complex correlation function through step 4f. At step 6o, a corresponding peak value $R[n]=(R^Irm[n])^2+(R^Qrm[n])^2$ is calculated. The digital signal processor 303 checks, at step 6p, whether or not the index n is equal to the value (K*L−S) to see if the calculation of peak values is ended. If the index n is not equal to the value (K*L−S), the index n is incremented by 1 at step 6q and step 6q returns to step 6o. Otherwise, the index n, a store variable temp and a peak value variable tp are initialized at step 6r to search the maximum peak value from the peak values calculated through step 6o. At step 6s, the digital signal processor 303 checks whether or not a peak value R[n+1] is greater than or equal to the store variable temp. If the peak value R[n+1] is greater than or equal to the store variable temp, the digital signal processor 303 stores, at step 6v, the peak value R[n+1] in the first or second memory 301 or 302 and replaces the peak value variable tp with n+1. At step 6t, the index n is examined to see if it is equal to the value (K*L−S). If they are not equal, the index n is incremented by 1 at step 6u, and otherwise, step 6t advances to step 4h. That is, if a current peak value is greater than a previous peak value, the digital signal processor 303 stores the current peak value, and otherwise, the digital signal processor 303 maintains the previous peak value. Through such a series of processes, the digital signal processor 303 stores the greater value in the first or second memory 301 or 302, and thus, the maximum peak value is detected.

If the maximum peak point is detected, a data set including the maximum peak point tp is selected at step 4h. The received digital signal r[p] has the following k data sets:

$r_{K0}[w]=r_I[w*K]+jr_Q[w*K]$ (where w=0, . . . , L−1)

$r_{K1}[w]=r_I[w*K+1]+jr_Q[w*K+1]$ (where w=0, . . . , L−1)

$r_{K3}[w]=r_I[w*K+3]+jr_Q[w*K+3]$ (where w=0, . . . , L−1)

$r_{K(K-1)}[w]=r_I[w*K+(K-1)]+jr_Q[w*K+(K-1)]$ (where w=0, . . . , L−1)

In order to select a data set including the maximum peak point tp among the K received digital data sets, the following expression is selected:

$r_{Ktp}[w]=r_{Itp}[w*K+(tp \% K)]+jr_{Qtp}[w*K+(tp \% K)]$ (where tp % K means a modular operation)

Figure 6D:
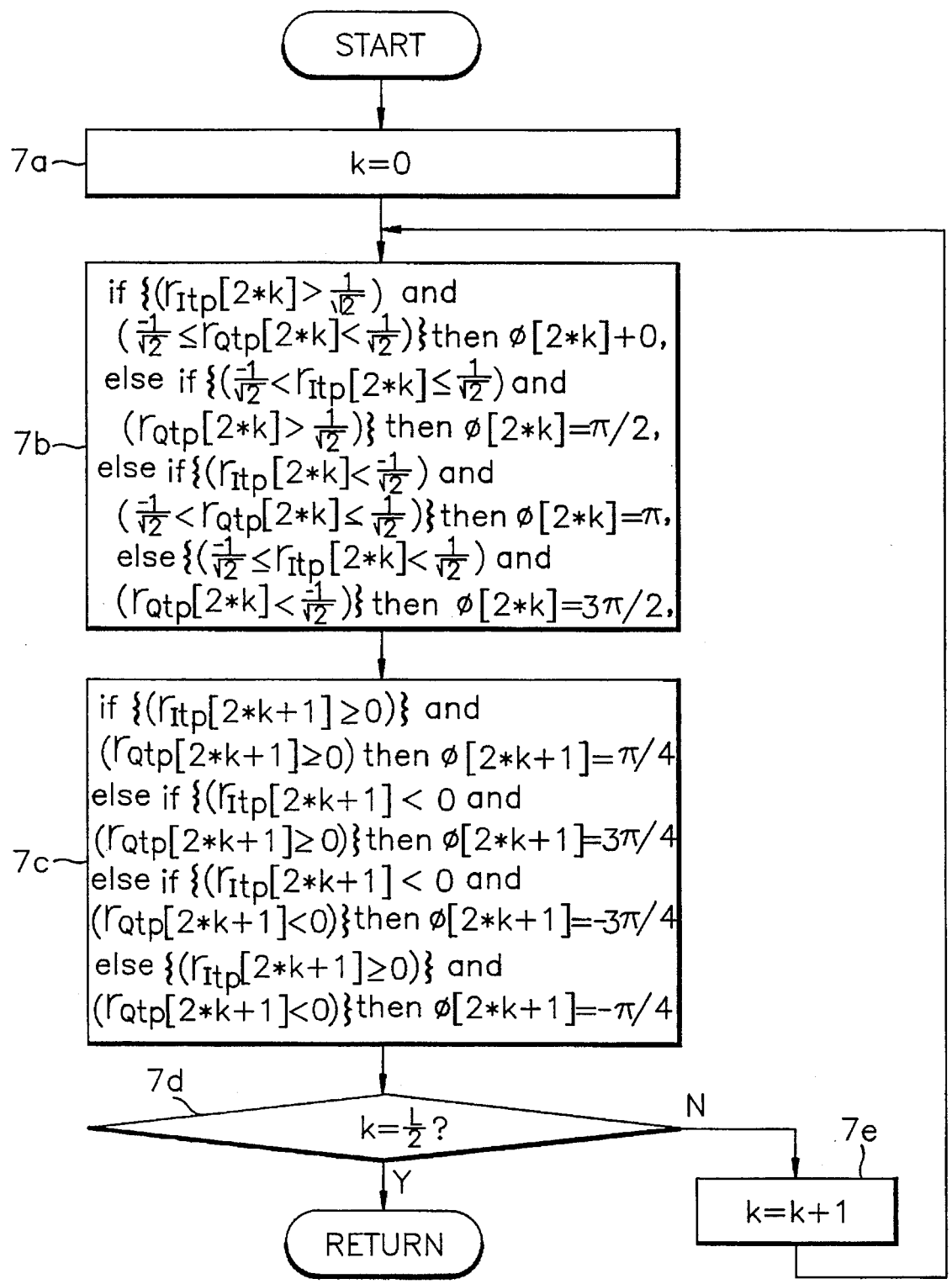

After selecting the data set $r_{Ktp}[w]=r_{Itp}[w*K+(tp \% K)]+jr_{Qtp}[w*K+(tp \% K)]$, the digital signal processor 303 determines the phase of the received signal at step 4i which is shown in detail in FIG. 6D.

At step 7a, an index k for detecting synchronization from a received signal is set to 0. The phase determination of the received signal is divided into an even symbol ⊗ and an odd symbol +e,crc ++ee . At step 7b, the phase of the even symbol ⊗ is selected from one of 0, π/2, π, 3π/2 as indicated in FIG. 5A. The threshold value for determining the phase at the I-channel and Q-channel amplitude regions is obtained from one positive (+) or negative (−) value as shown in FIG. 5B.

Figure 5D:
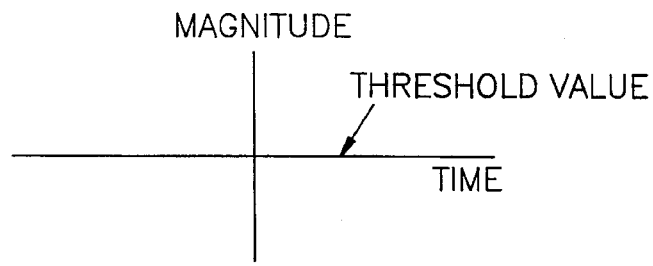

At step 7c, the phase of the odd symbol ⊗ is selected from of π/4, 3π/4, −3π/4, −π/4 as indicated in FIG. 5C. The phase at the I channel and Q channel amplitude regions is obtained from the threshold value as shown in FIG. 5D.

The phase value of the even and odd symbols ⊗ and ⊗ using the threshold value is determined by the following Table-1 and Table-2. In Table-1 and Table-2, $I_{KT}'$ and $Q_{KT}'$ are the magnitude of the received signal value at t=KT of the I channel and Q channel, respectively, and øn' is the received phase. Table-1 and Table-2 show the received phase value for the even and odd symbols, respectively.

TABLE 1

| | (where K = 1, 2, . . . L/2) |
|---|---|
| øn' | $I_{KT}$ , $Q_{KT}$ |
| 0 | $I(2_{KT})' > 1/\sqrt{2}$, $-1/2 \leq Q(2_{KT})' < 1/\sqrt{2}$ |
| π/2 | $-1/\sqrt{2} < I(2_{KT})' \leq 1/\sqrt{2}$, $Q(2_{KT})' > 1/\sqrt{2}$ |
| π | $I(2_{KT}) < -1/\sqrt{2}$, $-1/\sqrt{2} < Q(2_{KT})' \leq 1/\sqrt{2}$ |
| 3π/2 | $-1/\sqrt{2} \leq I(2_{KT})' < 1/\sqrt{2}$, $Q(2_{KT})' < 1/\sqrt{2}$ |

TABLE 2

| | (where K = 0,1, . . . (L − 1)/2) |
|---|---|
| øn' | $I'_{(2K+1)T}$, $Q'_{(2K+1)T}$ |
| π/4 | $I'_{(2K+1)T} \geq 0$, $Q'_{(2K+1)T} \geq 0$ |
| 3π/4 | $I'_{(2K+1)T} < 0$, $Q'_{(2K+1)T} \geq 0$ |
| −3π/4 | $I'_{(2K+1)T} < 0$, $Q'_{(2K+1)T} < 0$ |
| −π/4 | $I'_{(2K+1)T} \geq 0$, $Q'_{(2K+1)T} < 0$ |

At step 7d, the digital signal processor 303 checks whether or not the index k is equal to L/2. If the index k is not equal to L/2, the index k is incremented by 1 at step 7e to determine the phase of the received signal for all messages. Otherwise step 7d goes to step 4j.

Figure 6E:
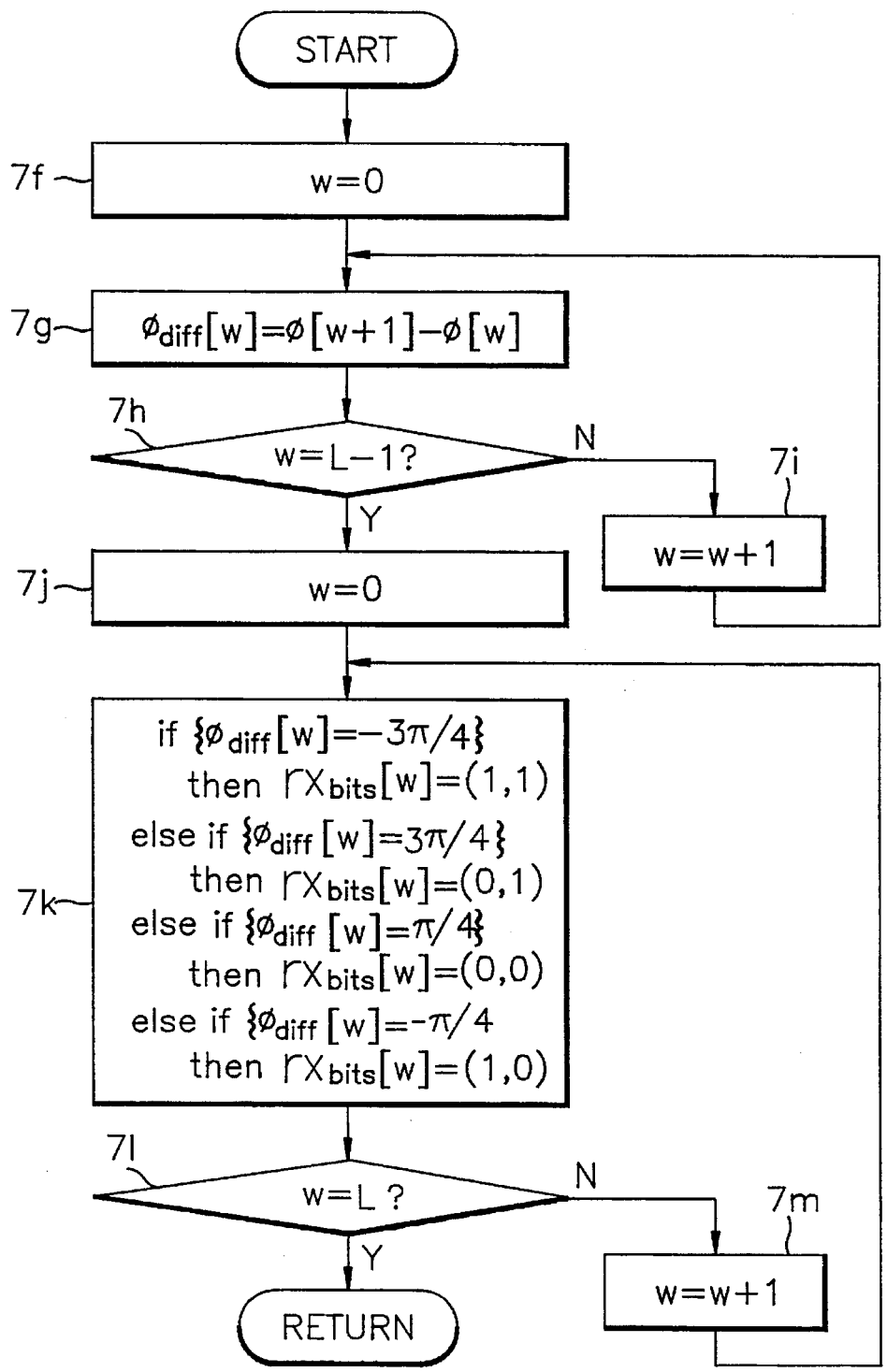

At step 4j, the digital signal processor 303 calculates the phase difference between symbols from the phase value of each symbol calculated through step 4i. Step 4j is indicated in FIG. 6E.

At step 7f, the digital signal processor 303 set a phase difference determining index w to 0. At step 7g, a phase difference ødiff[w] is calculated from the phase values of the previous and next symbols. This is executed for the entire symbols through steps 7h and 7i. At step 7j, the index w is set to 0 in order to determine data by sequentially reading out the final phase detected value. At step 7k, data $X_K$ and $Y_K$ is determined according to the phase difference ødiff[w] as indicated in Table-3.

TABLE 3

| ødiff[w] | $X_K$ | $Y_K$ |
|---|---|---|
| −3π/4 | 1 | 1 |
| 3π/4 | 0 | 1 |
| π/4 | 0 | 0 |
| −π/4 | 1 | 0 |

After determining the data corresponding to the phase difference from the above Table-3, the index w is checked, at step 7l, to see if it is equal to the message length L. If the index does not reach at the message length L, the index w is incremented by 1 at step 7m. Step 7m returns to step 7k. If the index w reaches at the message length L, step 7l proceeds to step 4k to convert the received data to serial data. At step 4l, the serial data is demodulated to binary data.

As described above, since the demodulating process uses a determined clock which is not synchronized to a transmitting end without the clock recovery circuit necessary for the A/D conversion after shifting the received signal to the base band, the structure of the entire circuit is simple. Further, since the demodulating circuit at the base band is constructed by a digital system, a signal connection to an equalizer used in a mobile radio communication equipment and to a peripheral control circuit is facilitated. Furthermore, the miniaturization of a chip is easily attained relative to a conventional circuit.

Figure 7:
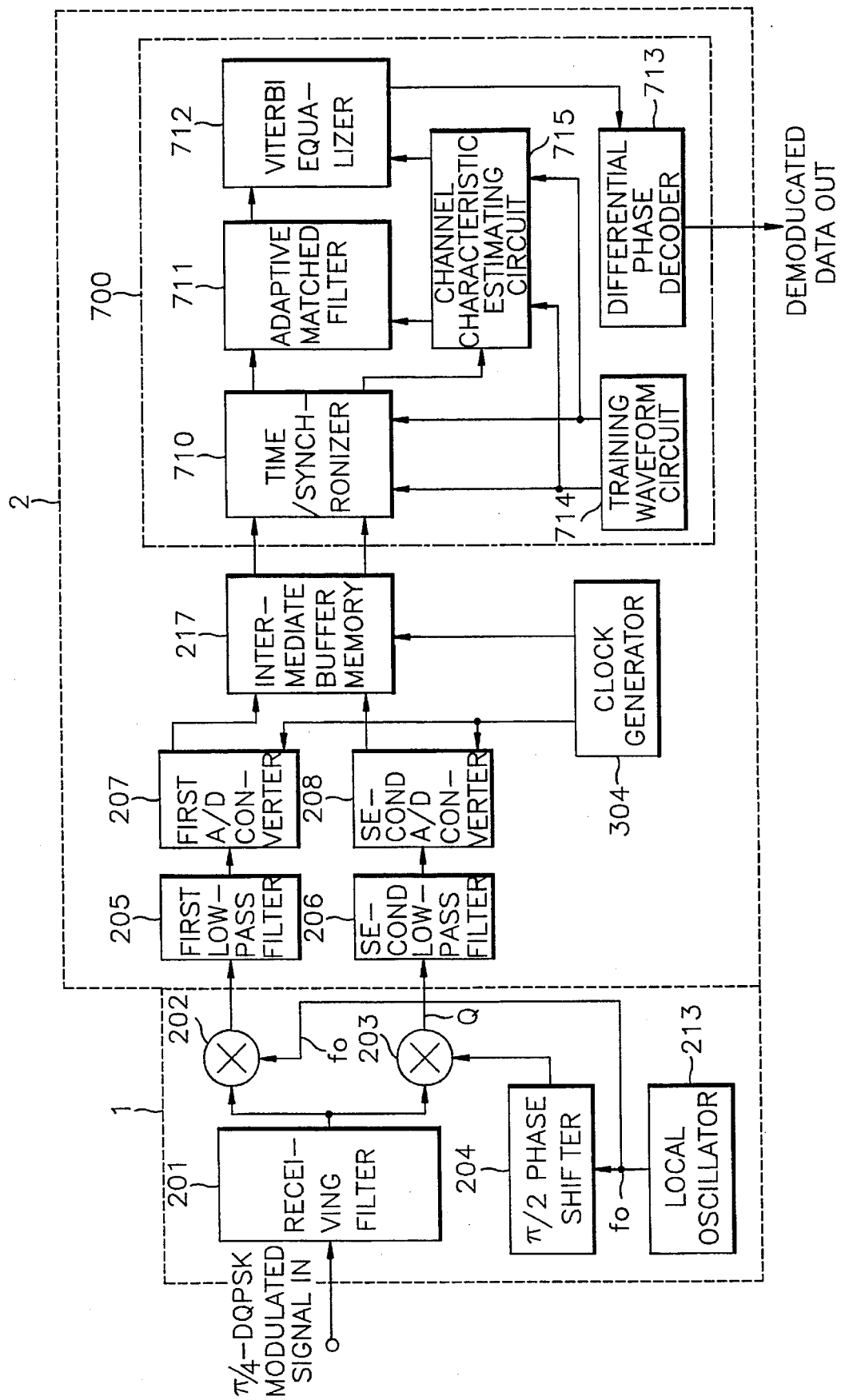
FIG. 7 is a block diagram illustrating another embodiment of a demodulating circuit according to the present invention.

FIG. 7 shows another embodiment of the demodulating circuit according to the present invention. The circuit of FIG. 7 uses a Viterbi equalizer to reduce an error rate of data generated by a multipath fading effect, and a correlation peak point having a maximum correlation function value between a given data train, that is, reference training sequence and a training sequence of the received signal is detected in order to simply process synchronization.

The circuit of FIG. 7 has the same construction as FIG. 2 except a digital signal processing circuit 700. The digital signal processing circuit 700 includes a time synchronizer 710, adaptive matched filter 711, training waveform circuit 714, channel characteristic estimating circuit 715, Viterbi equalizer 712 and differential phase decoder 713.

The multipliers 202 and 203 function as channel separation and convert an RF band signal to a base band signal. At the same time, the multipliers 202 and 203 separate two channel signals which exist in the mixed form in the received signal. That is, since the received signal is a DQPSK signal form, the multipliers 202 and 203 separate the received signal to an I channel and Q channel by multiplying two carrier waves cos ωot and −sin ωot by the received signal (where ωot means 2πfo when the frequency of a local carrier wave is fo). The first and second low-pass filters 205 and 206 pass only a low frequency component among the signals separated to the I channel and Q channel to eliminate the noise of a high frequency component. Namely, the first and second low-pass filters 205 and 206 eliminate the harmonic noise generated in a signal transition process to the base band and carrier wave component having a high frequency and simultaneously preventing aliasing. The first and second A/D converters 207 and 208 convert an analog signal generated from the first and second low-pass filters 205 and 206 into a digital signal. In this case, the first and second A/D converters 207 and 208 perform oversampling by using a clock having a frequency corresponding to integral times an original digital data frequency. That is, if a data clock used when original digital data is converted into an analog signal is D-CK and K is a natural number, the A/D converter performs oversampling by using a clock of K×(D-CK).

The intermediate buffer memory 217 stores the signals generated from the first and second A/D converters 207 and 208. Since the signal processing speed at the digital signal processing circuit 700 differs from that at the first and second A/D/converters 207 and 208, the intermediate buffer memory 217 temporarily stores the data. Moreover, the intermediate buffer memory 217 is of a dual port memory type which is accessible from the bilateral direction. A clock value used when the intermediate buffer memory 217 is read and written may differ, and operations of the first and second A/D converters 207 and 208 and digital signal processing circuit 700 may be independently implemented.

The digital signal processing circuit 700 performs a demodulation algorithm for the π/4-DQPSK modulated signal and may use a general digital signal processing chip so as to operate by software or a very large scale integrated circuit (VLSI) chip.

The time synchronizer 710 detects the location of data within a time slot by calculating a correlation function between π/4-DQPSK modulated data for a predetermined reference training sequence and data stored in the intermediate buffer memory 217. If the length of a received time slot is L×T, a data train oversampled and digitally converted from the first and second A/D converters 207 and 208 is separated to k sets with respect to each channel:

| I channel | Q channel |
|---|---|
| $\{I_0, I_K, I_{2K}, \ldots, I_{(L-1)K}\}$ | $\{Q_0, Q_K, Q_{2K}, \ldots, Q_{(L-1)K}\}$ |
| $\{I_1, I_{K+1}, I_{2K=+1}, \ldots, I_{(L-1)K+1}\}$ | $\{Q_1, Q_{K+1}, Q_{2K=+1}, \ldots, Q_{(L-1)K+1}\}$ |
| $\{I_2, I_{K+2}, I_{2K=+2}, \ldots, I_{(L-1)K+2}\}$ | $\{Q_2, Q_{K+2}, Q_{2K=+2}, \ldots, Q_{(L-1)K+2}\}$ |
| • | • |
| • | • |
| • | • |
| $\{I_{K-1}, I_{2K-1}, I_{3K-1}, \ldots, I_{LK-1}\}$ | $\{Q_{K-1}, Q_{2K-1}, Q_{3K-1}, \ldots, Q_{LK-1}\}$ |

Where K is an oversampling rate and subscripts represent a generated order for each channel. Thus the correlation function value between each set of the data train separated to k sets and the π/4-DQPSK modulated waveform of the reference training sequence is calculated. One set having a maximum peak value out of the correlation function values of k sets is selected as a receiving train of one time slot and receiving data at a time showing the peak value is detected as reference training sequence data.

That is, if the receiving train of the I channel and Q channel is:

$$r[p]=r_I[p]+jr_Q[p] \text{ (where } p=0, 1, 2, \ldots, K \times L-1) \quad (1)$$

and the π/4-DQPSK modulated waveform of the reference training sequence is:

$$m[uu]=m_I[uu]+jm_Q[uu] \text{ (where } uu=0, 1, 2, \ldots S-1 \text{ and } S \text{ is the number of bits constituting the reference training sequence)} \quad (2)$$

the correlation function value for each channel is as follows:

$$R^lrm[J] = \sum_{ll=0}^{S-1} \{r_I[K \times ll + J] \times m_I[ll] + r_Q[K \times ll + J] \times m_Q[ll]\} \quad (3)$$
$$\text{(where } J = 0, 1, \ldots, (K \times L - S + 1))$$

-continued $$R_Q rm[J] = \qquad (4)$$

$$\sum_{mm=0}^{S-1} \{-r_Q[K \times mm + J] \times m_Q[mm] + r_Q[K \times mm + J] \times m_Q[mm]\}$$

(where $J = 0, 1, \ldots, (K \times L - S + 1)$)

The peak value of the correlation functions obtained by expressions (3) and (4) as follows:

$$R[J] = R^I rm[J]^2 + R^Q rm[J]^2 \text{ (where } J=0, 1, \ldots (K \times L-S+1)) \qquad (5)$$

If a maximum peak value is $J_p$, the maximum peak value $J_p$, at a point $J_p \pm 1$, is detected as a reference time tp. Therefore, the location of the reference training sequence among the received digital signals for one time slot is obtained. A set including data in which the maximum peak value tp is detected is selected as the receiving data train, and the time synchronizer 710 applies the receiving data train to the adaptive matched filter 711. Further, the time synchronizer 710 provides a vector Pc consisting of the correlation function values between the reference training sequence modulation waveform and the received training sequence modulation waveform to the channel characteristic estimating circuit 715. If the reference training sequence is 0, $-\pi/4$, $\pi/2$, $\pi/4$, $\pi/2$, $-3\pi/4$, $\pi/2$, $-3\pi/4$, $\pi/2$, $\pi/4$, $\pi$, $-3\pi/4$, $\pi$, $-\pi/4$, the reference training sequence modulation waveform is as follows:

$$m_I[i] = 1, 1/\sqrt{2}, 0, 1/\sqrt{2}, 0, -1/\sqrt{2}, 0, -1/\sqrt{2},$$
$$0, 1/\sqrt{2}, -1, -1/\sqrt{2}, -1, -1/\sqrt{2}.$$

$$m_Q[i] = 0, -1/\sqrt{2}, -1, 1/\sqrt{2}, 1, -1/\sqrt{2}, 1, -1/\sqrt{2},$$
$$1, 1/\sqrt{2}, 0, -1/\sqrt{2}, 0, 1/\sqrt{2}.$$

Such a waveform is stored in the training waveform circuit 714 to be used in each block. The channel characteristic estimating circuit 715 estimates the impulse response characteristic of the channel and calculates an inner product value Hc of an inverse vector between the vector Pc generated from the time synchronizer 710 and a vector Rc consisting of the correlation function values of the reference training sequence modulation waveform. This can be expressed by:

$$Hc = Rc \cdot Pc \qquad (6)$$

Where Hc is a coefficient vector of a discrete time model.

The adaptive matched filter 711 implements a filtering function to maximize a signal-to-noise ratio of the received signal. If the coefficient vector of the discrete time model generated from the time synchronizer 710 is Hc, and its conjugate vector is Hc*, the adaptive matched filter 711 performs matched filtering for Hc*(−t). In this case, the channel characteristic varies every time slot, the adaptive matched filter 711 performs the matched filtering every time slot. If such an adaptive matched filter is not used, the output of the time synchronizer 710 is directly applied to the Viterbi equalizer 712.

Figure 10A:
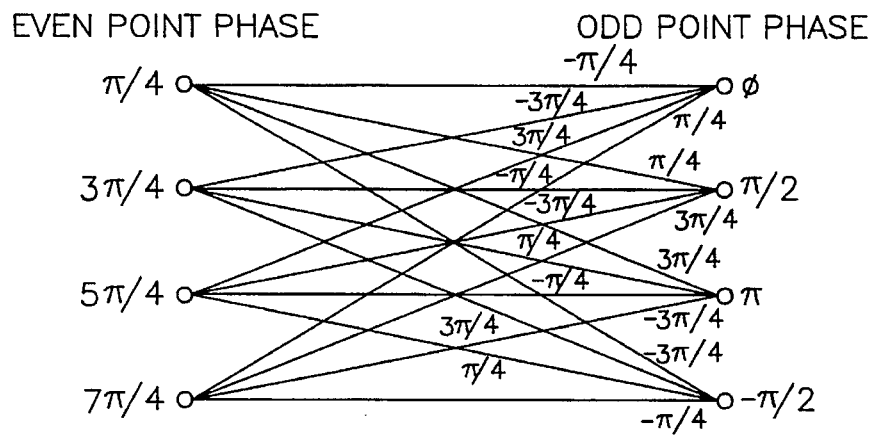
FIGS. 10A and 10B are lattice state diagrams illustrating algorithm performed by a Viterbi equalizer of FIG. 7.
Figure 10B:
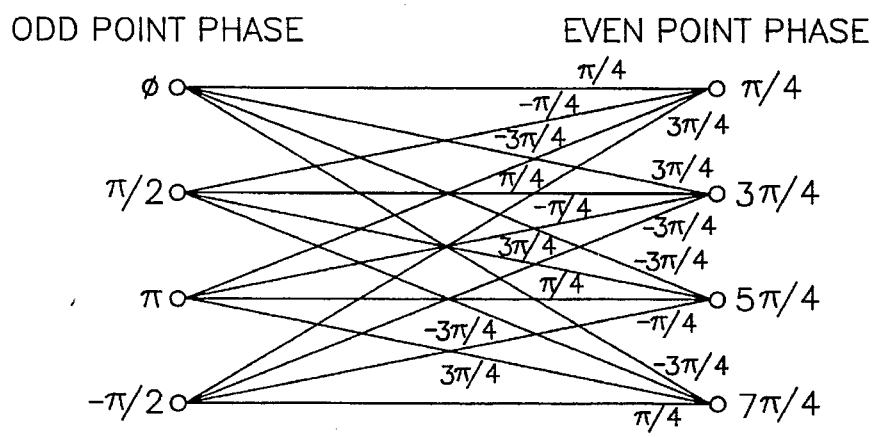

The Viterbi equalizer 712 which is one of the digital equalizing means estimates and determines the phase information of the $\pi/4$-DQPSK modulated signal having the largest probability to be received from the transmitting end by use of the channel characteristic estimated by the channel characteristic estimating circuit 715 with respect to the output signal of the adaptive matched filter 711. The algorithm performed by the Viterbi equalizer 712 is known, for example, in U.S. Pat. No. 5,119,400, and similar to Viterbi decoding algorithm for decoding convolutional codes. The transmitted value in the $\pi/4$-DQPSK modulated signal is the data train corresponding to the phase difference and may be indicated as shown in FIGS. 10A and 10B. Namely, each point is divided to an even point and an odd point having a different state characteristic. Four state variations exist from the even point to the odd point at each sate, and similarly, four state variations exist from the odd point to the even point at each state. The length of back-tracking path is determined by delay spread due to multipath fading effect.

A phase difference value $\Delta\phi$ generated from the Viterbi equalizer 712 is an encoded value in response to prescribed data and a decoding process should be implemented. This function is performed by the differential phase decoder 713 and shown in Table-4.

TABLE 4

| data ($X_K$, $Y_K$) | | |
|---|---|---|
| $X_K$ | $Y_K$ | $\Delta\phi$ |
| 1 | 1 | $-3\pi/4$ |
| 0 | 1 | $3\pi/4$ |
| 0 | 0 | $\pi/4$ |
| 1 | 0 | $-\pi/4$ |

Figure 8:
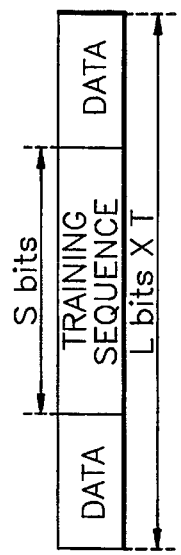
FIG. 8 is a diagram illustrating the construction of transmitted data according to the present invention.

FIG. 8 shows the structure of transmitted data when the data length of one time slot is L bits and the length of the training sequence S. A reference symbol T is a transmission period of data of one bit. The training sequence is transmitted during a given interval determined through mutual protocol at transmitting and receiving sides in one time slot. The information for each bit constituting the training sequence should be known to the transmitting and receiving sides.

Figure 9:
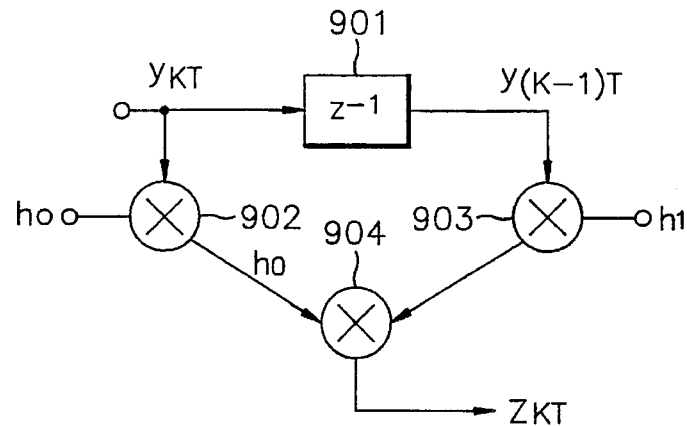
FIG. 9 is a block diagram illustrating an adaptive filter of FIG. 7.

FIG. 9 illustrates the adaptive matched filter 711 of FIG. 7. The adaptive matched filter 711 includes a delay 901, two multipliers 902 and 903, and an adder 904. The delay 901 delays the data generated from the time synchronizer 710. If the vector Hc generated from the channel characteristic estimating circuit 715 is expressed as follows, $$Hc = \begin{bmatrix} h_0 \\ h_1 \end{bmatrix}$$

the multiplier 902 multiplies a value $h_o$ by the data generated from the time synchronizer 710. The multiplier 903 multiplies the output signal of the delay 901 by a value $h_1$. The adder 904 adds the outputs of the multipliers 902 and 903.

As may be apparent from the aforementioned description, an error rate caused by the s multipath fading effect is reduced by using the Viterbi equalizer and a channel characteristic is estimated. That is, since most of demodulating processes are digitally performed and accurate demodulation is attained by the small calculating amount, the interface with a peripheral circuit is easily implemented. Moreover, if the demodulating circuit is integrated by a small one chip by including the A/D converter, the base band processing can be achieved with one chip.

While preferred embodiments of the present invention have been particularly shown and described, it will be understood by those skilled in the art that foregoing and other changes in form and details may be made without departing from the spirit and scope of the present invention.

What is claims is:

1. A digital demodulating method for use in a time division multiple access channel, for eliminating a carrier wave from a modulated signal transmitter by $\pi/4$-differentially quadrature phase shit keying and demodulating the transmitted signal to digital data, comprising the step of:

converting a received said π/4-differentially quadrature phase shift keying modulated signal to base band I channel and Q channel component signals of said π/4-differentially quadrature phase shift keying modulated signal;

performing oversampling on said base band I and Q channel component signals using a clock frequency corresponding to K times a data transmission frequency of binary data represented by said received π/4-differentially quadrature phase shift keying modulated signal, where K is an integer greater than one, for producing oversampled signals and storing the oversampled signals in a memory;

selected time synchronized portions of said oversampled signals stored in said memory, said time synchronized portions comprising only every Kth sample; and demodulating said time synchronized portions of the oversampled signals stored in said memory to produce said binary data.

2. The digital demodulating method of claim 1, said selecting step further comprising:

separating said oversampled signals stored in said memory into a plurality of data sets;

calculating complex correlation function values between each said data set and a predetermined reference training sequence; and detecting a maximum peak value of the calculated complex correlation function values, wherein said time synchronized portions selected corresponding to the data set from which said maximum peak value is calculated.

3. The digital demodulating method of claim 2, said demodulating step further comprising:

determining predefined phase values for samples in said data set corresponding to said time synchronized portions of the oversampled signals stored in said memory;

determining phase differences for successively determined said phase values; and generating a pair of binary values according to each said phase difference determined.

4. A digital demodulating circuit for use in a time-division multiple access channel, having a radio frequency processing circuit for filtering a π/4-differentially quadrature phase shift keying (DQPSK) modulated signal, converting the filtered signal to base band I channel and a Q channel signal components, said digital demodulating circuit comprising:

first and second low-pass filters for low-pass filtering said I channel and Q channel signal components, respectively;

first and second analog/digital converters for oversampling respective filtered analog signals output from said first and second low-pass filters to generate respective I and Q channel data, wherein said I and Q channel data include a plurality of data sets;

an intermediate buffer memory for temporarily storing said I and Q channel data;

a clock generator for providing a clock for use in oversampling of said first and second analog/digital converters and for controlling write speed of said intermediate buffer memory;

a reference waveform memory for storing data representative of a reference training modulation signal;

a time synchronizer for calculating complex correlation function values between I and O channel data for each of said plurality of data sets stored in said intermediate buffer memory and said data representative of a reference training modulation signal stored in said reference waveform memory, detecting a maximum peak value within a time slot of the calculated complex correlation function values, and generating a signal indicative of a selected one of said data sets of the I and Q channel data stored in said intermediate buffer memory, said selected data set corresponding to said maximum peak value;

a phase determining circuit for determining the phase of the signal generated by said time synchronizer every predetermined time period;

a differential phase detecting and binary data determining circuit for detecting a phase difference according to the phase determined from said phase determining circuit and determining binary data adapted for a π/4-differentially quadrature phase shift keying (DQPSK) modulation characteristic according to the detected phase difference; and a parallel/serial converter for converting binary data output from said differential phase detecting and data determining circuit into serial data to generate a differential phase value by the unit of 2 bits.

5. A method for demodulating a π/4-differentially quadrature phase shift keying (DQPSK) modulated signal, comprising the steps of:

calculating a complex correlation function between digitally converted data representative of a received said π/4-differentially quadrature phase shift keying modulated signal and stored reference training modulation data in order to adjust bit synchronization of said digitally converted data, wherein said digitally converted data comprises a plurality of data sets generated by oversampling I channel and Q channel components of said received modulated signal;

detecting a maximum peak point within a time slot from the values of the calculated complex correlation function;

selecting a bit synchronized one of said data sets of said digitally converted data, said selected data set including said maximum peak point; and detecting phase differences from said selected data set, determining binary data from said phase differences, and generating demodulated binary data by converting said binary data into serial data.

6. The method of claim 5, said step of detecting phase differences further comprising:

estimating an impulse response characteristic of a channel in response to a vector representative of the values of the calculated complex correlation function; and performing Viterbi equalization on said selected data set using said estimated impulse response characteristic in order to detect said phase differences.

7. The method of claim 6, further comprising:

performing adaptive matched filtering of said selected data set prior to performing said Viterbi equalization.

8. The method of claim 5, said step of detecting phase differences further comprising:

determining phase values of said digitally converted data from said selected data set; and comparing said phase values determined for successive samples of said digitally converted data from said selected data set in order to detect said phase differences.

9. The method of claim 8, said step of determining phase values further comprising:

separating said digitally converted data from said selected data set into even and odd data pairs, each said data pair representing corresponding I-channel and Q-channel digital samples of said received modulated signal;

comparing said even data pairs to threshold values defining the limits of quadrants corresponding to predefined phase values in order to determine said phase values of said even data pairs; and comparing said odd data pairs to threshold values defining the limits of quadrants corresponding to predefined phase values in order to determine said phase values of said odd data pairs, said predefined phase values for said odd data pairs differing by $\pi/4$ radians form said predefined phase values for said even data pairs.

10. A digital demodulating circuit for demodulating a $\pi/4$-differentially quadrature phase shift keying (DQPSK) modulated signal, comprising:

channel separating means for converting a received said $\pi/4$-differentially quadrature phase shift keying modulated signal to respective base band I-channel and Q-channel signals of analog form by multiplying said received $\pi/4$-differentially quadrature phase shift keying modulated signal by a sine wave and a cosine wave, respectively;

analog/digital converter means for converting said I-channel and Q-channel signals of an analog form into digital I-channel and Q-channel data, wherein said digital I-channel and Q-channel data comprise a plurality of data sets corresponding to an oversampling rate of said analog/digital converted means;

buffer memory means for temporarily storing the plurality of data sets of digital I-channel and Q-channel data output from said analog/digital converter means;

time synchronizing means for detecting a location of received training data within a time slot among said I-channel and Q-channel data by calculating correlation function values between reference training data representative of a $\pi/4$-differentially quadrature phase shift keying modulated reference waveform and each of said plurality of data sets stored in said buffer memory, said time synchronizing means detecting a maximum peak value out of the correlation function values and outputting, as a receiving data train, one of said data sets corresponding to said maximum peak value;

a memory means for storing said reference training data;

channel characteristic estimating means for estimating impulse response characteristic value of a channel in response to a vector output by said time synchronizing means, said vector containing correlation function values calculated by said time synchronizing means;

Viterbi equalizing means for determining phase values of said receiving data train by performing a Viterbi algorithm for said channel characteristic value; and differential phase decoding means for detecting a phase difference from said phase values and generating binary data corresponding to said phase difference.

11. The digital demodulating circuit as claimed in claim 10, further comprising:

an adaptive matched filter disposed between said time synchronizing means and said Viterbi equalizing means for performing adaptive matched filtering for an output signal of said time synchronizing means in response to an output of said channel characteristic estimating means.

12. The digital demodulating circuit as claimed in claim 11, wherein said adaptive matched filter comprises:

a delay for delaying said output signal of said time synchronizing means;

a first multiplier for multiplying one value constituting a vector generated from said channel characteristic estimating means by said output signal of said time synchronizing means;

a second multiplier for multiplying another value constituting said vector generated from said channel characteristic estimating means by an output signal of said delay; and an adder for adding outputs of said first and second multipliers.

13. A digital demodulation circuit, comprising:

means for separating a received differential phase shift keying modulated signal into in-phase and quadrature-phase component signals;

means for generating time synchronized pairs of digital samples representing values of respective said in-phase and quadrature-phase component signals every predetermined time period, said predetermined time period being the period of a data transmission frequency of binary data transmitted by said received differential quadrature phase shift keying modulated signal;

phase determining means for determining a phase value for each said pair of digital samples by comparison with threshold values defining the limits of predefined phase values; and differential phase comparison and binary data determining means for determining phase differences between said phase values determined for successive pairs of said digital samples, and for demodulating said transmitted binary data in accordance with said phase differences, said means for generating time synchronized pairs of digital samples comprising:

first and second convertering means for oversampling said in-phase and quadrature-phase component signals to generate a plurality of said pairs of digital samples every said predetermined time period; and a time synchronizer means for calculating complex correlation function values between a plurality of data sets and data representative of a reference training modulation signal, said plurality of data sets each including one of said plurality of pairs of digital samples from a plurality of successive said predetermined time periods, and said time synchronized pairs of digital data samples generated by selection of one of said plurality of data sets having a maximum peak calculated complex correlation function value within a time slot.

14. A digital demodulating circuit for use in a time-division multiple access channel, having a radio frequency processing circuit for converting a received differential phase shift keying (DQPSK) modulated signal to base band I channel and a Q channel analog signal components, said digital demodulating circuit comprising:

first and second analog/digital converters for oversampling respective said I channel and Q channel analog signal components to generate I and Q channel digital data, wherein said I and Q channel digital data include a plurality of data sets corresponding to a rate of said oversampling;

a memory for temporarily storing said I and Q channel digital data; and digital signal processing means for
- calculating complex correlation function values between I and Q channel digital data for each of said plurality of data sets stored in said memory and stored data representative of a reference training modulation signal,
- detecting a maximum peak value within a time slot of the calculated complex correlation function values, and selecting one of said data sets of I and Q channel digital data corresponding to said maximum peak value,
- determining phase values for respective pairs of I and Q channel digital data in said selected one of said data sets,
- detecting phase differences by comparison of successively determined phase values, and
- determining demodulated binary data according to the detected phase differences.

* * * * *